March 5, 1940.  A. H. ORCUTT  2,192,839

VALVE MECHANISM FOR CONTROLLING FLUID OPERATED MACHINE TOOLS

Filed Feb. 14, 1938  4 Sheets-Sheet 1

A. H. Orcutt
Inventor

By Glascock Downing & Seebold
Attys.

March 5, 1940. A. H. ORCUTT 2,192,839
VALVE MECHANISM FOR CONTROLLING FLUID OPERATED MACHINE TOOLS
Filed Feb. 14, 1938 4 Sheets-Sheet 2

A. H. Orcutt
INVENTOR

By Glascock Downing & Seebold
ATTYS.

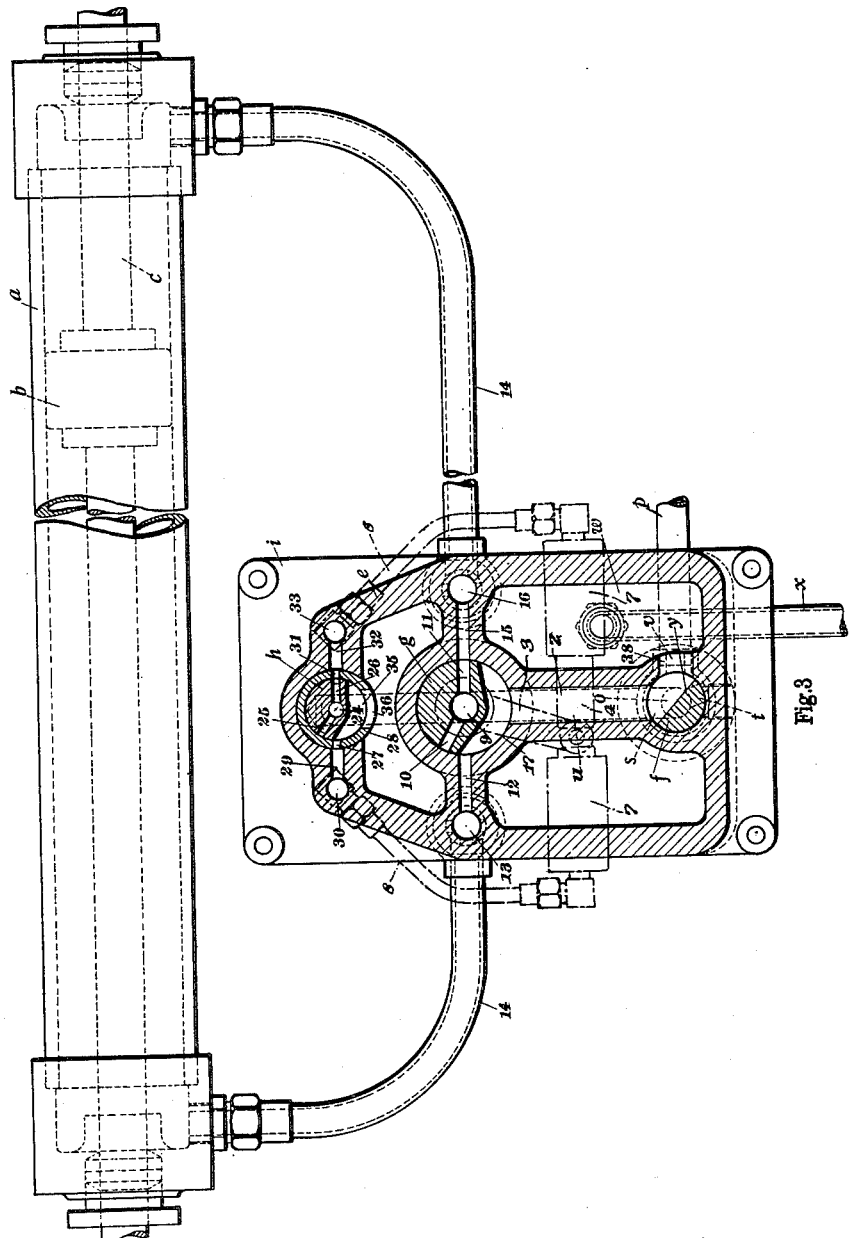

Patented Mar. 5, 1940

2,192,839

UNITED STATES PATENT OFFICE 2,192,839

VALVE MECHANISM FOR CONTROLLING FLUID OPERATED MACHINE TOOLS

Arthur Hitchcock Orcutt, Birmingham, England, assignor to The Gear Grinding Company Limited, Birmingham, England Application February 14, 1938, Serial No. 190,527
In Great Britain February 25, 1937

3 Claims. (Cl. 121—45)

This invention has for its object to provide an improved valve mechanism for controlling fluid operated machine tools such as metal grinding or cutting machines.

The invention comprises the combination with a hollow valve housing, of a hand operated oscillatory valve adapted to control the flow of fluid into the housing and from the mechanism to be operated by the fluid, a second oscillatory valve adapted to control the flow of fluid to and from the said mechanism, fluid operated means for actuating this latter valve, and a third oscillatory valve for controlling the flow of fluid to and from the said fluid operated means, the third valve being adapted to be actuated by striking pieces.

In the accompanying sheets of explanatory drawings:

Figure 3 is a section on the line 3.3 of Figure 2 showing in outside elevation the actuating mechanism to and from which the flow of pressure fluid is controlled by the valve mechanism.

Figure 1:
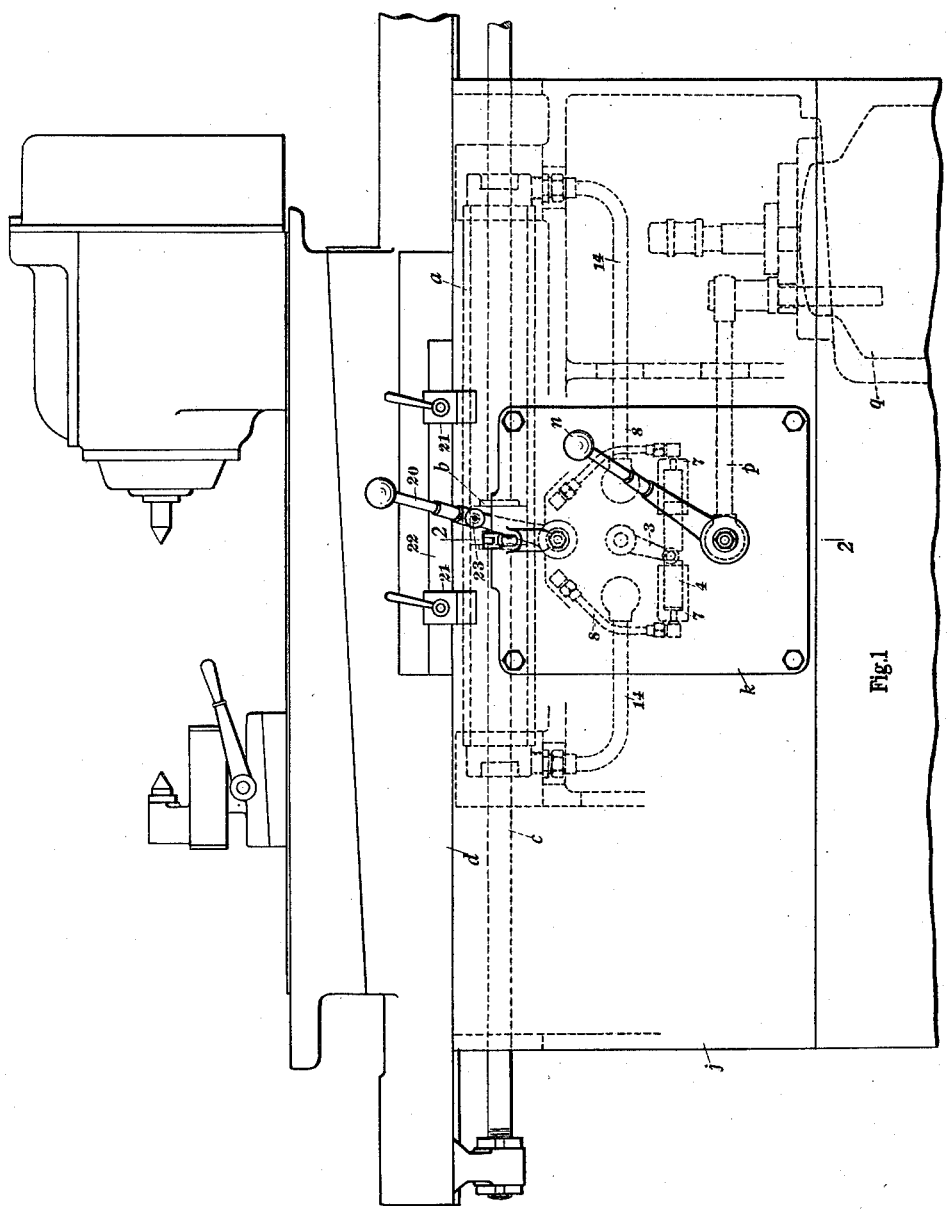
Figure 1 is a front elevation of a metal grinding machine provided with valve mechanism constructed in accordance with the invention.
Figure 2:
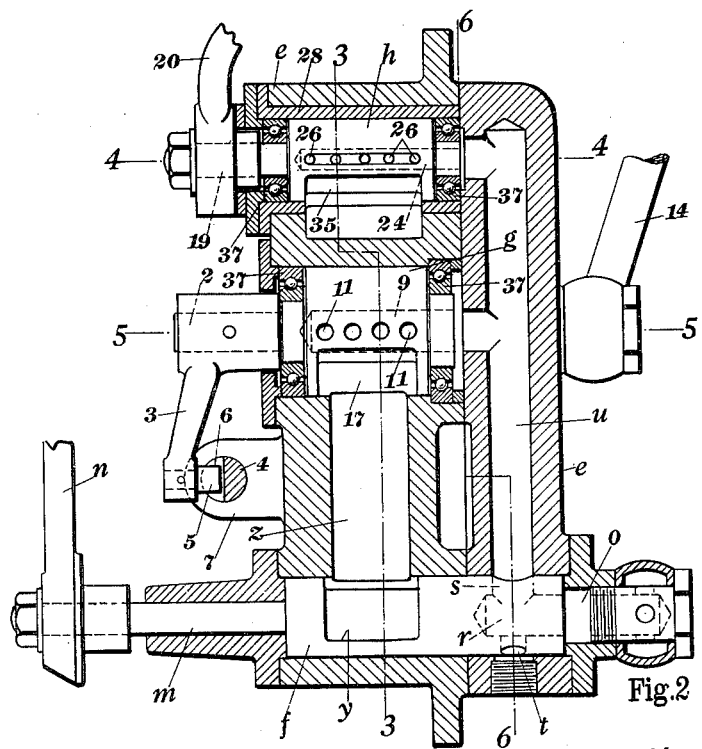
Figure 2 is a sectional side elevation of the valve mechanism taken on the line 2.2 of Figure 1 and drawn to a larger scale than the latter figure.
Figure 5:
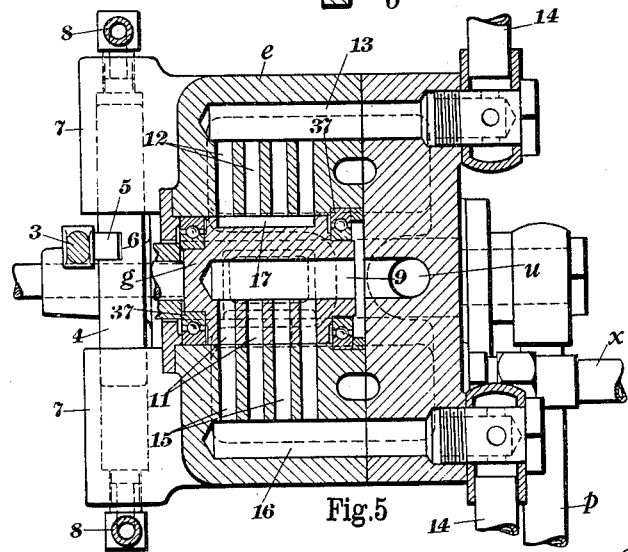
Figures 4 to 6 are respectively sections taken on lines 4.4, 5.5 and 6.6 of Figure 2.
Figure 4:
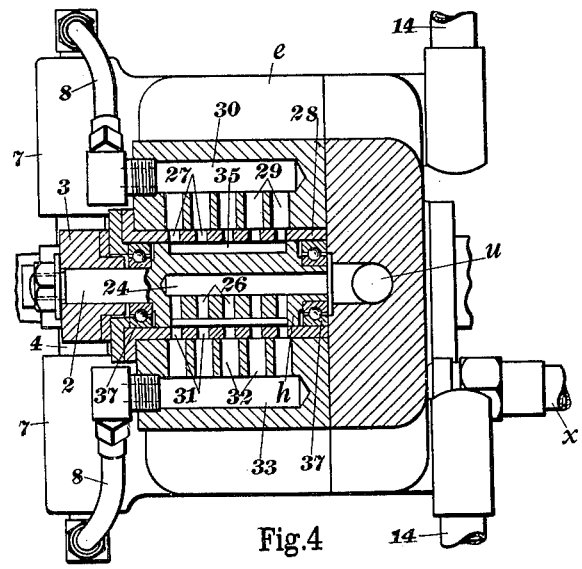
Figure 6:
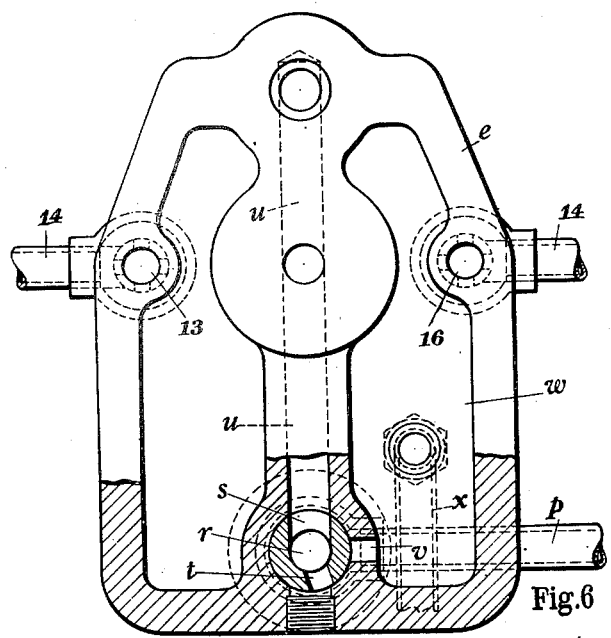

In carrying the invention into effect as shown for controlling the flow of pressure fluid to and from the opposite ends of a cylinder $a$ containing a piston $b$ and rod $c$ for actuating a reciprocatory slide $d$ of the machine, I employ a hollow housing $e$ which may be made from two or more parts and which contains three oscillatory cylindrical valves $f$, $g$, $h$. These valves are arranged preferably with their axes parallel to each other in corresponding cylindrical chambers formed in the housing $e$, and the latter is provided with flanges $i$ for enabling it to be attached by screws to the fixed supporting structure $j$ of the machine. Also the housing $e$ is enclosed by a front cover plate $k$ which is shown in Figure 1 but which is omitted from Figures 2 to 6.

The first valve $f$ is provided at its outer end with a stem $m$ carrying a hand operating lever $n$, and at its inner end it lies opposite to a pressure fluid inlet $o$ secured to the housing $e$. This inlet $o$ is connected by a pipe $p$ to a pressure fluid supply pump (not shown) either directly or through a pressure chamber $q$ (Figure 1). The inner end of the valve is formed with an axial passage $r$ and radial passages $s$, $t$, whereby the inlet can be connected either to a passage $u$ formed in the housing $e$ and communicating with all of the valves $f$, $g$, $h$, or to a port $v$ formed in the housing $e$ and communicating with a chamber $w$ also formed in the housing, the chamber $w$ being provided with a discharge pipe $x$ leading to a sump (not shown). An intermediate part $y$ of the valve $f$ is shaped or otherwise adapted to control communication between another passage $z$ formed in the housing $e$ and leading from the valve $g$, and an opening 38 formed in the housing and leading to the discharge chamber $w$.

The second valve $g$ is provided at its outer end with a stem 2 carrying a lever 3 which is connected to the intermediate portion of a reciprocatory valve actuating plunger 4, the connection being effected by a projection 5 provided on the outer end of the lever 3 and engaging a recess 6 in the plunger 4. The ends of this plunger 4 are contained in cylinders 7 to the outer ends of which are connected pipes 8 controlled by the valve $h$. The valve $g$ is formed with an axial passage 9 opening into the fluid supply passage $u$ in the housing $e$, and with radial passages 10, 11 communicating with the axial passage 9. In one extreme position of the valve $g$ the passages 10 communicate through corresponding passages 12 and another passage 13 in the housing $e$ with one of a pair of pipes 14 leading to the opposite ends of the working cylinder $a$, and in the other extreme position of the valve $g$ the passages 11 communicate through corresponding passages 15 and another passage 16 in the housing with the other of the pipes 14. By this arrangement pressure fluid from the passage $u$ in the housing can be admitted to either of the pipes 14. Also an intermediate part 17 of the valve $g$ is shaped as shown to form a passage which co-operates with the passages 12, 15 in the housing for controlling the flow of fluid from either of the pipes 14 to the passage $z$ in the housing leading through the valve $f$ to the discharge chamber $w$. Further, the passages 10, 11 and 17 in the valve $g$, are so arranged relatively to each other that the portions of the valve $g$ separating the passages 10 and 11 from the passage 17 are respectively narrower than the passages 12 and 15 in the housing, so that when the valve is passing from either of its extreme positions to the other it cannot cause fluid to be trapped in either end of the cylinder $a$.

The third valve $h$ is provided at its outer end with a stem 19 carrying a lever 20 which is adapted to be actuated by striking pieces 21 on the slide $d$ of the machine, these striking pieces being adjustably secured to a guide 22 on the slide $d$, and being adapted to engage a projection 23 on the rear of the lever 20. This lever 20 may also be actuated by hand. The purpose of the valve $h$ is to control the flow of pressure fluid to and from the cylinders 7 of the plunger 4 which actuates the valve $g$. The valve $h$ has an axial passage 24 leading to the fluid supply passage $u$ in the housing, and radial passages 25, 26 communicating with the axial passage 24. In one extreme position of the valve $h$ the passages 25 communicate, through openings 27 in a fixed sleeve 28 surrounding the valve $h$, and through corresponding passages 29 and another passage 30 in the housing $e$, with one of the pair of pipes 8 leading to the plunger cylinders 7 above mentioned. In the other extreme position of the valve $h$ the passages 26 communicate, through openings 31 in the sleeve 28, and through corresponding passages 32 and another passage 33 in the housing $e$, with the other of the pipes 8. By this arrangement pressure fluid from the passage $u$ in the housing can be admitted to either of the pipes 8, the openings 27, 31 in the sleeve 28 being of ample size to ensure prompt action of the plunger 4. Also an intermediate part 35 of the valve $h$ is suitably shaped to cooperate with the openings 27, 31 in the sleeve 28 for controlling the discharge of fluid from the pipes 8 through another opening 36 in the sleeve to the discharge chamber $w$ in the housing.

Preferably the valves $g$, $h$, are carried by ball or roller bearings 37 to facilitate easy movement.

By the mechanism above described I am able to effect the manual and automatic control of the flow of fluid to and from the working cylinder $a$ in a very simple and convenient manner, and to obtain reversal of the motions of the slide $d$ smoothly and without shock at all normal speeds. To set the machine in motion the valve $f$ is moved from the closed to the open position, to allow fluid to flow along the common passage $u$ in the housing to the other two valves $g$, $h$. The fluid then passes through the valve $h$ to one of the cylinders 7 for actuating the valve $g$, the other cylinder 7 being at the same time connected to the discharge chamber $w$ in the housing. This causes the valve $g$ to be moved to a position which allows pressure fluid to pass to one end of the working cylinder $a$ for actuating the piston $b$. While the piston $b$ is in motion fluid flows from the other end of the cylinder $a$ past the valves $g$, $f$, to the discharge chamber $w$ in the housing and thence to the sump. At the end of each movement of the slide $d$ under the action of the piston $b$ one of the striking pieces 21 operates the lever 20 of the valve $h$ and by rocking over this valve causes a corresponding change in the position of the valve $g$ and a consequent reversal of the motion of the piston $b$ in the working cylinder $a$. The machine can be stopped at any time without shock by hand actuation of the valve $f$. When the latter valve is closed it not only prevents the admission of pressure fluid from the pump to the housing $e$, but also prevents the flow of exhaust fluid from the cylinder $a$ to the discharge chamber $w$, with the result that undesirable movement of the slide $d$ by inertia after the supply of pressure fluid has been interrupted is effectively prevented.

The invention is not limited to the example above described as subordinate details of construction and arrangement can be varied to suit different requirements.

Having thus described my invention what I claim as new and desire to secure by Letters Patent is:

1. Valve mechanism for a fluid operated machine tool, such as a metal cutting or grinding machine, comprising a combination of a hollow valve housing having an inlet for pressure fluid and an outlet for exhaust fluid, and having a pair of openings through which pressure fluid can flow from said housing to the machine tool and exhaust fluid can flow into said housing from the machine tool, a pressure fluid passage communicating with either of said openings, an exhaust fluid passage communicating with the other of said openings, a hand operable oscillatory valve serving in one position to establish and in another position to interrupt communication between said inlet and said pressure fluid passage and between said outlet and said exhaust fluid passage, a second oscillatory valve for alternately establishing and interrupting communication between said openings and said passages, means responsive to pressure fluid from said housing for actuating said second valve, said housing being provided with additional openings through which pressure and exhaust fluid can flow to and from said means, and a third oscillatory valve for alternately establishing and interrupting communication between said additional openings and said inlet and outlet, said third valve being adapted to be actuated by striking pieces.

2. Valve mechanism for a fluid operated machine tool, such as a metal cutting or grinding machine, comprising the combination of a hollow valve housing having an inlet for pressure fluid and an outlet for exhaust fluid, and having a pair of openings through which pressure fluid can flow from said housing to the machine tool and exhaust fluid can flow into said housing from the machine tool, an exhaust fluid discharge chamber communicating with said outlet, a pressure fluid distributing passage communicating with either of said openings, an exhaust fluid passage communicating with the other of said openings, a hand operable oscillatory valve serving in one position to establish and in another position to interrupt communication between said inlet and said fluid pressure passage and between said discharge chamber and said exhaust fluid passage, a second oscillatory valve for alternately establishing and interrupting communication between said openings and said passages, means responsive to pressure fluid from said housing for actuating said second valve, said housing being provided with a pair of additional openings through which pressure and exhaust fluid can flow to and from said means, and a third oscillatory valve for alternately establishing and interrupting communication between said additional openings and said fluid pressure passage and discharge chamber, said third valve being adapted to be actuated by striking pieces.

3. Valve mechanism as claimed in claim 2, in which said hand operable valve is provided with an axial passage adapted for connection to a source of pressure fluid supply, and with radial passages through which pressure fluid can pass to said pressure fluid distributing passage or to said discharge chamber, an intermediate portion of said hand operable valve being shaped to establish and interrupt communication between said discharge chamber and said exhaust passage.

ARTHUR HITCHCOCK ORCUTT.